United States Patent
Betzen et al.

(10) Patent No.: US 9,662,973 B2
(45) Date of Patent: May 30, 2017

(54) MOTOR VEHICLE FILLER INLET COMPARTMENT LID ARRANGEMENT

(71) Applicant: GM GLOBAL TECHNOLOGY OPERATIONS LLC, Detroit, MI (US)

(72) Inventors: Heiko Betzen, Bausendorf (DE); Markus Frommann, Bingen am Rhein (DE)

(73) Assignee: GM GLOBAL TECHNOLOGY OPERATIONS LLC, Detroit (*) Notice: Subject to any disclaimer, the term of this patent is extended or adjusted under 35 U.S.C. 154(b) by 0 days.

(21) Appl. No.: 14/801,214

(22) Filed: Jul. 16, 2015

(65) Prior Publication Data
US 2016/0016464 A1 Jan. 21, 2016

(30) Foreign Application Priority Data

Jul. 16, 2014 (DE) .................. 20 2014 005 799 U

(51) Int. Cl.
*B60K 15/05* (2006.01)
*B60K 15/04* (2006.01)
*B60K 13/04* (2006.01)

(52) U.S. Cl.
CPC .............. *B60K 15/05* (2013.01); *B60K 15/04* (2013.01); *B60K 13/04* (2013.01); *B60K 2015/0419* (2013.01); *B60K 2015/0435* (2013.01); *B60K 2015/0464* (2013.01); *B60K 2015/053* (2013.01); *B60K 2015/0576* (2013.01)

(58) Field of Classification Search
CPC ................ B60K 15/0406; B60K 15/05; B60K 2015/053

USPC ........................................................ 296/97.22
See application file for complete search history.

(56) References Cited

U.S. PATENT DOCUMENTS

| 4,886,182 | A | 12/1989 | Fedelem et al. |
| 7,080,671 | B2 | 7/2006 | Watkins |
| 7,753,431 | B2 | 7/2010 | Yamamoto |
| 8,087,434 | B2 | 1/2012 | Stephan et al. |
| 8,292,113 | B2* | 10/2012 | Nakaya .................. B60K 15/05 220/263 |
| 2007/0040409 | A1* | 2/2007 | Alfaro .................... B60K 15/05 296/97.22 |

FOREIGN PATENT DOCUMENTS

| DE | 19535335 A1 | 3/1997 |
| DE | 19711331 A1 | 9/1998 |
| EP | 0115644 A1 | 8/1984 |
| FR | 2800018 A1 | 4/2001 |

OTHER PUBLICATIONS

Great Britain Patent Office, Great Britain Search Report for Great Britain Application No. 1512044.7, dated Dec. 16, 2015.

* cited by examiner

*Primary Examiner* — Dennis H Pedder
(74) *Attorney, Agent, or Firm* — Lorenz & Kopf LLP

(57) ABSTRACT

A motor vehicle filler inlet compartment lid arrangement is disclosed. A filler inlet compartment lid is mounted so that it can swivel around a lid axis relative to a vehicle body. A filler module with at least one filler passage for filling up the motor vehicle is joined with the filler inlet compartment lid so that it can swivel relative to the vehicle body between a use and non-use position.

8 Claims, 3 Drawing Sheets

MOTOR VEHICLE FILLER INLET COMPARTMENT LID ARRANGEMENT

CROSS-REFERENCE TO RELATED APPLICATION

This application claims priority to German Patent Application No. 202014005799.0, filed Jul. 16, 2014, which is incorporated herein by reference in its entirety.

TECHNICAL FIELD

The present disclosure pertains to a motor vehicle filler inlet compartment lid arrangement as well as to a motor vehicle, in particular to a passenger car with such a filler inlet compartment lid arrangement.

BACKGROUND

DE 197 11 331 A1 discloses a motor vehicle filler inlet compartment lid arrangement with a body-mounted filler neck, which essentially extends into the vehicle interior perpendicular to a longitudinal axis of the vehicle. In particular to avoid back pressure in the filler neck during a fill-up, the latter as a rule includes a specific minimum length with a specific maximum curvature. Because it extends perpendicular to the longitudinal axis of the vehicle, such an inwardly projecting filler neck thus disadvantageously diminishes the available installation space in the vehicle interior.

SUMMARY

According to one aspect of the present disclosure, a motor vehicle filler inlet compartment lid arrangement includes a filler inlet compartment lid that can swivel, in particular rotate, around a lid axis relative to a vehicle body. In an embodiment, the filler inlet compartment lid is pivoted to the vehicle body or a filler inlet in particular joined thereto. In an embodiment, the filler inlet compartment lid is mounted on the vehicle body or a filler inlet in particular joined thereto so that it can only rotate (and not slide) relative to the vehicle body, and in another embodiment is mounted on the vehicle body or a filler inlet in particular joined thereto so that it can slide and rotate relative to the vehicle body, in particular in a so-called rotary slide bearing.

In an embodiment, the motor vehicle filler inlet compartment lid arrangement includes a fill module with one or more fill passages with fill openings for filling up the motor vehicle. In an embodiment, a fill opening or passage is provided for filling up the motor vehicle with fuel, and correspondingly communicates with a fuel tank. Additionally or alternatively, a filler opening or passage can be provided for filling up the motor vehicle with another fluid, in particular oil, urea or the like, and correspondingly communicate with a supply tank other than a fuel tank. In particular, a filler passage may include a passage integrated into a filler module and/or a line attached to a housing of the filler module.

In one aspect of the present disclosure, the filler module can be swiveled, in particular rotated, relative to the vehicle body. In an embodiment, the filler module is joined with the filler inlet compartment lid.

In an embodiment, the filler module thus can swivel or swivels out and away from the vehicle interior, in particular by having the filler inlet compartment lid joined thereto for this purpose swivel out and away from the vehicle interior.

In an embodiment, this simplifies access to the filler opening(s) of the filler passages, which in an embodiment face the tail end of a vehicle. Accordingly, the filler module in an embodiment can be swiveled or swiveled out, in particular by means of the filler inlet compartment lid joined thereto, into a use position, in which its filler openings can be accessed from outside the vehicle, in particular project outwardly at least partially, preferably completely, over a vehicle body.

In an embodiment, one or more inlet openings of the filler module, in particular an inlet opening plane standing perpendicular on an axial direction of the inlet opening or passage and/or in which lies an edge of the inlet opening in a swiveled-out use position, includes an angle measuring at least 45°, in particular at least 60°, with an edge of the vehicle body that encompasses the filler inlet compartment lid when the latter is closed. In an embodiment, the swiveled-out filler module can thus cause an inlet opening (plane) to be inclined relative to the enveloping vehicle body in the use position in such a way that a feeding device, such as a pump nozzle, can be rather or approximately introduced into the inlet opening or passage parallel to the enveloping vehicle body, and not as previously be rather or approximately introduced perpendicular to the enveloping vehicle body. In an embodiment, this makes it possible to improve the handling of such a feeding device and/or working area required for the fill-up.

In an embodiment, the filler module additionally or alternatively can be swiveled or swivels inwardly toward the vehicle interior, in particular by inwardly swiveling the filler inlet compartment lid joined thereto for this purpose toward the vehicle interior. Correspondingly, the filler module in one embodiment can be swiveled or inwardly swiveled into a non-use position, in particular by means of the filler inlet compartment lid joined thereto, in which its filler openings are inaccessible from the vehicle exterior, in particular do not outwardly project over a vehicle body.

In an embodiment, such a filler module can advantageously provide long filler passages with a slight maximum curvature, which with the module inwardly swiveled advantageously utilize the installation space available in the vehicle interior due to their only sparingly inclined arrangement relative to the vehicle body, in particular exhibit a flat construction in the transverse and/or vertical direction of the vehicle or project only slightly into the vehicle interior.

In an aspect of the present disclosure, the filler module is mounted so that it can swivel around a module axis spaced apart from the cap axis relative to the vehicle body. Additionally or alternatively, the filler module is slideably mounted on the filler inlet compartment lid or hinged to the filler inlet compartment lid. In an embodiment, this makes it possible to realize an advantageous swiveling kinematics.

Given a filler inlet compartment lid that is inwardly swiveled, in particular aligned flush with the vehicle body, the filler module can in one embodiment be arranged at least essentially parallel relative to the filler inlet compartment lid. In an embodiment, a longitudinal extension of the filler module, in particular perpendicular to its module axis, and/or a longitudinal extension or axial direction of at least one filler passage of the filler module correspondingly includes an angle with a longitudinal extension of the filler inlet compartment lid perpendicular to its lid axis that measures at most 45°, in particular at most 30°, in particular at most 15°.

In an embodiment, the filler module is swivel-mounted to the vehicle body or filler inlet. In an embodiment, it is arranged on a side of the filler inlet compartment lid inside the vehicle. Correspondingly, the module axis is offset against the lid axis toward the vehicle interior in an embodiment. In an embodiment, the module axis and lid axis include an angle that measures at most 10°, in particular at most 1°, with the preferably being parallel. Correspondingly, the module axis is spaced parallel apart from the lid axis in an embodiment.

In an embodiment, the filler module is slideably mounted on the filler inlet compartment lid by means of a linear guide. In an embodiment, this makes it possible to provide a simple, reliable and/or low-maintenance connection between the filler module and filler inlet compartment lid and/or an advantageous relative kinematics between the filler module and filler inlet compartment lid. In an embodiment, the linear guide includes at least one groove, which in a further development is straight and/or whose direction of extension intersects the lid axis or module axis and/or includes an angle with the latter that measures at least 75°, in particular being at least essentially perpendicular to the lid axis and module axis. A one- or multi-part guide element is guided in the groove so that it can be shifted on a slide or anti-friction bearing. In an embodiment, the groove is rigidly fixed to the filler inlet compartment lid and the guide element is rigidly fixed to the filler module, while the reverse holds true in another embodiment, in which the groove is rigidly fixed to the filler module, and the guide element is rigidly fixed to the filler inlet compartment lid. In an embodiment, the guide element is rotatably mounted in the groove, while in another embodiment, it is guided in the groove rigidly fixed to the filler inlet compartment lid in a torque-proof manner, and rotatably joined with the filler module, or guided into the groove rigidly fixed to the filler module in a torque-proof manner and rotatably joined with the filler inlet compartment lid.

In an embodiment, the filler module is hinged to the filler inlet compartment lid by means of one or several levers, which are each hinged with the filler module by a hinge joint and/or hinged with the filler inlet compartment lid by a hinge joint or an additional hinge joint. In conjunction with the lid and fill axis, this makes it possible in particular to realize a four-joint mechanism. In an embodiment, the rotational axes of the hinge joints of the levers include an angle with the module axis and/or lid axis that measures at most 10°, in particular at most 1°, preferably being parallel to the module axis and/or lid axis.

In particular, the module axis and/or lid axis can at least essentially be parallel to the vertical direction of the vehicle, so that the filler inlet compartment lid or filler module can outwardly swivel to the side. In like manner, they can in particular be essentially parallel to the longitudinal or transverse direction of the vehicle, so that the filler inlet compartment lid or filler module can outwardly swivel toward the top or bottom. In an embodiment, the lid and/or module axis correspondingly include an angle with a vertical, longitudinal or transverse direction of the vehicle that measures at most 40°, in particular at most 30°, in particular at most 20°.

In an embodiment, the module axis is arranged on a side of the lid axis facing the bond, in particular the slideable mounting or hinged attachment, of the filler module with the filler inlet compartment lid, in other words between the lid axis and the bond. In an embodiment, this makes it possible to set up an advantageous swiveling range. In another embodiment, the module axis is conversely arranged on a side of the lid axis facing away from the bond, in particular the slideable mounting or hinged attachment, of the filler module with the filler inlet compartment lid, in other words outside the area between the lid axis and bond. In an embodiment, this makes it possible to advantageously adjust the introduction module relative to the filler inlet compartment lid.

In an embodiment, the filler inlet compartment lid is mounted so that it can swivel without a hinge. In an embodiment, this makes it possible to advantageously reduce the installation space and/or outlay. In an embodiment, the lid axis is generally arranged between opposing edges of the filler inlet compartment lid, so that when the filler inlet compartment lid is outwardly swiveled, one of these opposing edges moves into the vehicle interior, in particular behind an exterior side of the body.

As explained above, the filler inlet compartment lid is mounted in one embodiment so that it can shift and rotate relative to the vehicle body, in particular on the vehicle body or a filler inlet in particular attached thereto, in particular in a so-called rotary slide bearing. In an embodiment, such a rotary slide bearing includes a groove or rail rigidly fixed to the lid, which is mounted so that it can rotate around the lid axis and in particular shift perpendicular to the lid axis. A further development can involve having a stop positively limit the shifting of the filler inlet compartment lid relative to the vehicle body on one or both sides.

In an embodiment, the lid arrangement includes a latch for positively locking the inwardly swiveled filler module and/or the inwardly swiveled filler inlet compartment lid. In an embodiment, this makes it possible to prevent an unintended, in particular unauthorized opening of the filler inlet compartment lid, and hence access to the filler passage(s).

In a further development, the latch in a locked position engages into one or more filler openings of the filler module. As a result, the filler opening(s) or passage(s) can simultaneously act as a counter-bearing fir the latch.

In a further development, the latch in the locked position engages into the filler opening(s) of the filler module so as to form a seal. As a result, the latch can simultaneously act as an independent, in particular additional or sole, seal for the filler opening(s) or passage(s) with the filler inlet compartment lid closed.

In a further development, the latch and filler opening(s) include complementary or congruent conical surfaces. A conical surface of the latch in the locked position can in particular abut against a conical seat of the filler opening(s) so as to form a seal. In an embodiment, this makes it possible for self-centering to take place and/or to improve the sealing surface and/or force. In an embodiment, the latch is mounted so that it can slide or swivel relative to a vehicle body, in particular on the vehicle body or filler inlet. In an embodiment, the lid arrangement in particular includes an electromagnetic or electromotive actuator for adjusting, in particular shifting or rotating, the latch into or out of positive engagement, in particular with the filler opening(s) or passage(s). This actuator can preferably be activated by means of a central locking mechanism, so as to lock the filler inlet compartment lid automatically with the motor vehicle locked.

Additionally or alternatively to a latch of the kind described above, the lid arrangement in one embodiment includes a locking mechanism for positively locking the filler module and/or filler inlet compartment lid, which can be locked and/or unlocked in particular by inwardly, in particular sequentially, manually swiveling the filler inlet compartment lid toward the vehicle interior. As a consequence, this locking mechanism can in particular be a so-called push & release or push-push locking mechanism. In this regard, reference is additionally made to the DE 197

11 331 A1 mentioned at the outset. The locking mechanism preferably includes a sliding block guide and a pin, which when in the latched position blocks the filler inlet compartment lid from swiveling out, and is forced out of this latched position by manually inwardly swiveling the filler inlet compartment lid toward the vehicle interior.

In an embodiment, the filler inlet compartment lid is biased toward the vehicle interior or away from the vehicle interior, in particular by means of an elastic spring means.

In an embodiment, the filler inlet compartment lid can be swiveled out of a closed position, in particular out of a no-use or closed position that is locked and/or aligned flush with the vehicle body, by at least 20° away from the vehicle interior into an open or use position. In an embodiment, this makes it possible to provide an advantageous access to the filler opening(s). Additionally or alternatively, the filler inlet compartment lid in one embodiment can be swiveled out of the closed position, in particular a closed or non-use position that is locked and/or aligned flush with the vehicle body, by at most 75°, in particular by at most 60°, away from the vehicle interior into the open or use position. In an embodiment, this makes it possible to advantageously reduce the space required for fill-up.

In an embodiment, the filler module includes a stop, which positively limits the filler module, and hence the filler inlet compartment lid, from swiveling out, in particular by contacting the vehicle body or filler inlet.

BRIEF DESCRIPTION OF THE DRAWINGS

The present disclosure will hereinafter be described in conjunction with the following drawing figures, wherein like numerals denote like elements.

DETAILED DESCRIPTION

Figure 2:
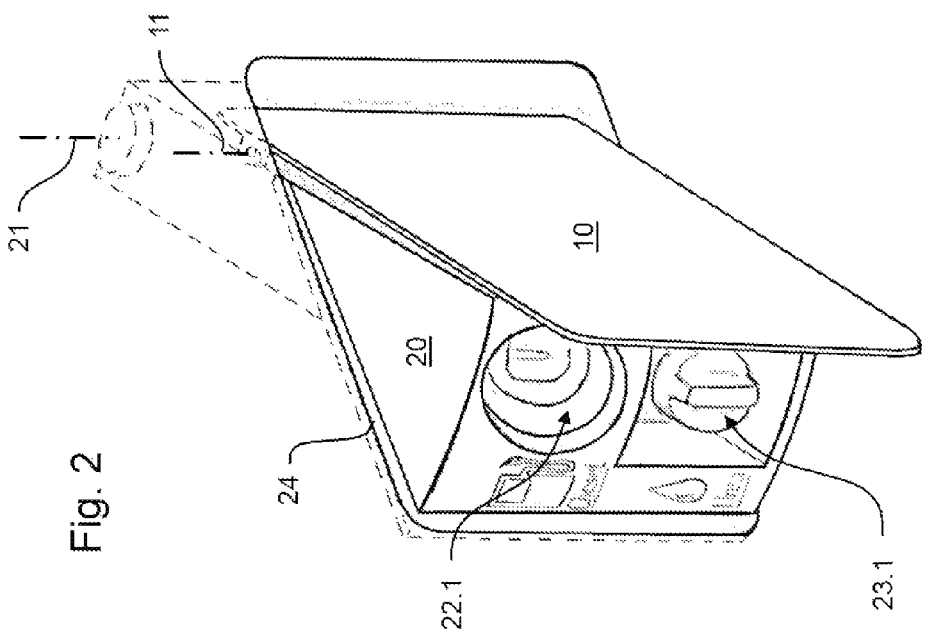
FIG. 2 illustrates the filler inlet compartment lid arrangement on FIG. 1 in a use position with outwardly swiveled filler inlet compartment lid.

The following detailed description is merely exemplary in nature and is not intended to limit the invention or the application and uses of the invention. Furthermore, there is no intention to be bound by any theory presented in the preceding background of the invention or the following detailed description.

The motor vehicle filler inlet compartment lid arrangement includes a filler inlet compartment lid 10, which is mounted so that it can swivel around a lid axis 11 relative to a vehicle body 100. The lid axis 11 rests perpendicularly on the image plane shown in FIGS. 3 and 4. The motor vehicle filler inlet compartment lid arrangement further includes a filler module 20 with a filler passage 22 that is denoted with dashed lines and has a filler opening 22.1 for filling the motor vehicle with fuel. A filler passage 23 with a filler opening 23.1 for filling the motor vehicle with urea can additionally be provided.

Figure 4:
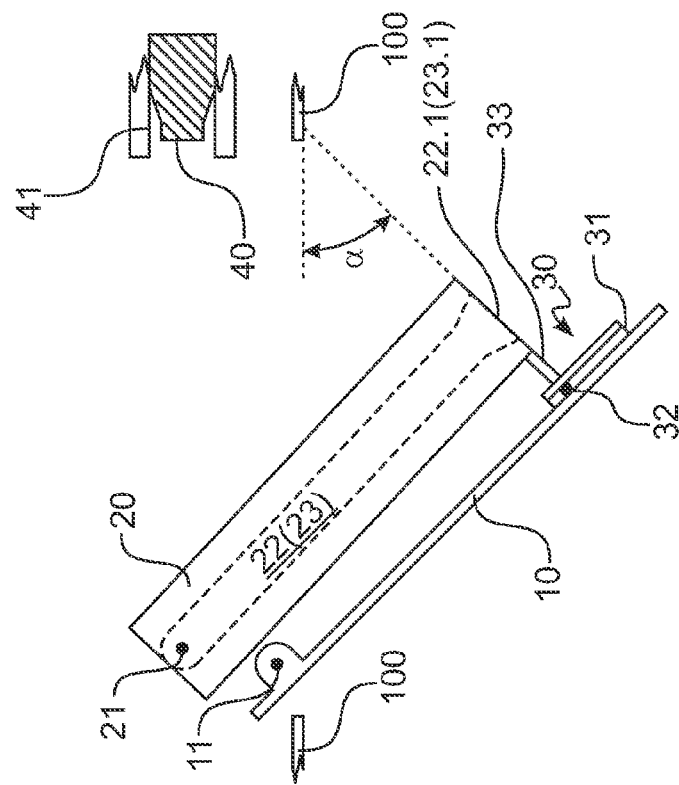
FIG. 4 illustrates the filler inlet compartment lid arrangement on FIG. 3 in a use position with outwardly swiveled filler inlet compartment lid.
Figure 3:
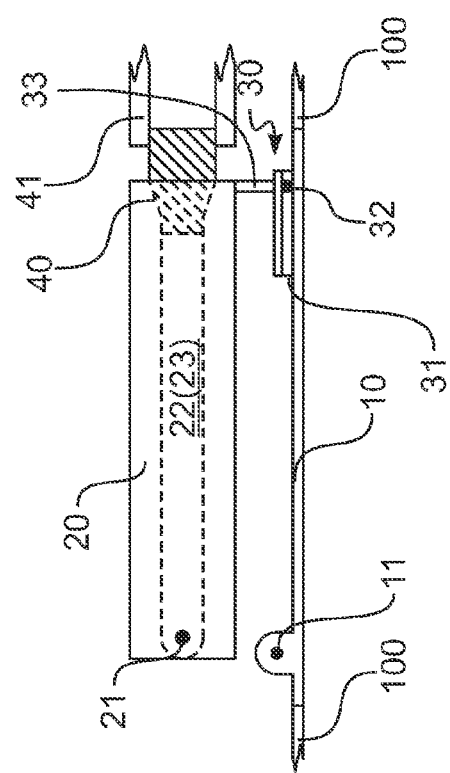
FIG. 3 illustrates a filler inlet compartment lid arrangement of a motor vehicle according to another embodiment of the present disclosure in a non-use position with inwardly swiveled filler inlet compartment lid.

The filler module 20 is mounted so that it can swivel around a module axis 21 spaced parallel apart from the lid axis 11 relative to the vehicle body 100, and mounted on the filler inlet compartment lid so that it can slide in the exemplary embodiment shown in FIGS. 3 and 4. As evident from the sequence of FIGS. 3 to 4, when the filler inlet compartment lid 10 is swiveled out of a closed non-use position depicted on FIG. 3, in which the finer inlet compartment lid 10 is aligned flush with the vehicle body 100, the filler inlet compartment lid 10 swivels the filler module 20 away from a vehicle interior (above on FIGS. 3, 4) (downwardly on FIGS. 3, 4) into an open use position depicted on FIG. 4, also away from the vehicle interior, and thereby facilitates access to the filler openings 22.1, 23.1 or passages 22, 23.

An angle α which the inlet openings 22.1, 23.1 include in the swiveled-out use position with an edge of the vehicle body 100 encompassed by the filler inlet compartment lid when the latter is closed measures 45° in the exemplary embodiment on FIGS. 3, 4. Given a filler inlet compartment lid 10 that is inwardly swiveled and aligns flush with the vehicle body 100 (FIG. 3), a longitudinal extension of the filler module 20 (horizontal on FIG. 3) includes an angle perpendicular to its module axis 21 with a longitudinal extension of the filler inlet compartment lid 10 (horizontal on FIG. 3) perpendicular to its lid axis 11 that measures about 0° in the exemplary embodiment on FIGS. 3, 4.

The filler module 20 is arranged on a side of the filler inlet compartment lid 10 located in the vehicle interior (at the top on FIGS. 3, 4). The module axis 21 is correspondingly offset against the lid axis 11 toward the vehicle interior (toward the top on FIGS. 3, 4). The module axis and lid axis are parallel. In the exemplary embodiment on FIGS. 3, 4, the filler module 20 is slideably mounted to the filler inlet compartment lid 10 by means of a linear guide 30. The linear guide 30 includes a straight groove 31, which includes an angle with the lid axis 11 and module axis 21 of about 90°. A guide element 32 is guided in the groove 31 so that it can be shifted on a slide or anti-friction bearing.

In the exemplary embodiment on FIGS. 3, 4, the groove 31 is rigidly fixed to the filler inlet compartment lid, and the guide element 32 is rigidly fixed to the filler module. Conversely, in a modification not shown, the groove can be rigidly fixed to the filler module, and the guide element can be rigidly fixed to the filler inlet compartment lid. In the exemplary embodiment on FIGS. 3, 4, the guide element 32 is rotatably mounted in the groove 31. It can also be guided in a torque-proof manner in the groove 31 rigidly fixed to the filler inlet compartment lid, and rotatably joined with a carrier 33 of the filler module 20 in a modification not shown.

In a modification not shown, the filler module 20 is hinged to the filler inlet compartment lid 10 by means of one or more levers, which each are hinged with the filler module 20 by a hinge joint and with the filler inlet compartment lid 10 by an additional hinge joint. To this end, the example, the carrier 33 can be hinged with the filler module 20 in a hinge joint not depicted, and hinged with the filler inlet compartment lid 10 in another hinge joint, which is provided in the view on FIG. 3 or FIG. 4 in place of the guide element 32 shown therein.

In the exemplary embodiment on FIGS. 3, 4, the module axis 21 is slightly arranged on a side (on the right on FIGS. 3, 4) of the lid axis 11 facing the linear guide 30; i.e., between the lid axis 11 and linear guide 30.

The filler inlet compartment lid 10 is mounted so that it can swivel without a hinge. Its lid axis 11 is arranged between opposing edges (left, right) of the filler inlet compartment lid 10, so that when the filler inlet compartment lid is swiveled out (see FIG. 4), the edge on the left on FIGS. 3, 4 retreats toward the vehicle interior behind an exterior side of the body (below on FIGS. 3, 4).

The lid arrangement includes a latch 40 for positively locking the swiveled-in filler module 20. To this end, the latch 40 in a locked position shown on FIG. 3 engages into the filler openings 22.1, 23.1 or passages 22, 23 of the filler module 20 so as to form a seal. Conical surfaces of the latch 40 abut against corresponding conical seats of the filler openings 22.1, 23.1 so as to form a seal. In the exemplary embodiment on FIGS. 3, 4, the latch 40 is mounted so that it can slide relative to the vehicle body 100. The lid arrangement includes an electromagnetic or electromotive actuator 41 for adjusting the latch 40 so that it positively engages (see FIG. 3) and disengages with the filler openings 22.1, 23.1 or passages 22, 23, which can be activated by means of a central locking mechanism (not shown).

In addition to this latch 40, the lid arrangement includes a push & release locking mechanism and an elastic spring means, which biases the filler inlet compartment lid 10 away from the vehicle interior (downwardly on FIG. 3) (not shown). By manually inwardly swiveling the filler inlet compartment lid 10 toward the vehicle interior (upwardly on FIG. 3), this locking mechanism can be unlocked, so that the spring means subsequently swivel the filler inlet compartment lid 10 away from the vehicle interior into the use position shown on FIG. 4. By again manually inwardly swiveling the filler inlet compartment lid 10 toward the vehicle interior, this locking mechanism can again be locked, and thereby blocks the filler inlet compartment lid 10 from being swiveled out by the spring means. In the exemplary embodiment on FIGS. 3, 4, the filler inlet compartment lid 10 can be swiveled out of the closed, locked non-use or closed position that aligns flush with the vehicle body (FIG. 3) by about 45° away from the vehicle interior (downwardly) into the use or open position (FIG. 4).

In the exemplary embodiment on FIGS. 3, 4, the module axis 21 and lid axis 11 include an angle with a vertical direction of the vehicle essentially perpendicular to the image plane on FIGS. 3, 4 that measures at most 20°, so as to allow the filler inlet compartment lid 10 or filler module 20 to outwardly swivel to the side. Alternatively, they can also include this angle with the longitudinal or transverse direction of the vehicle, so as to allow the filler inlet compartment lid 10 or filler module 20 to swivel out upwardly or downwardly.

Figure 1:
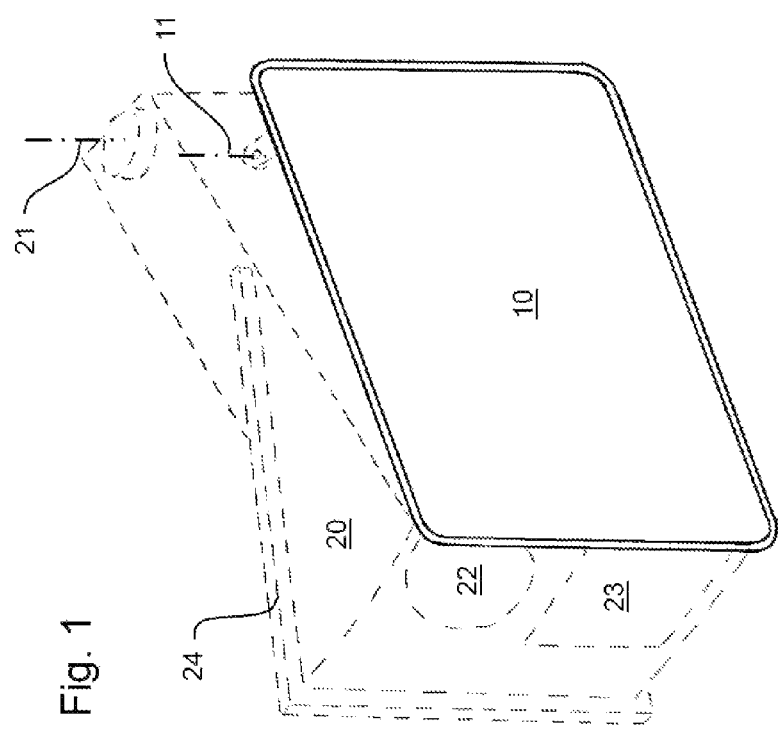
FIG. 1 illustrates a filler inlet compartment lid arrangement of a motor vehicle according to an embodiment of the present disclosure in a perspective view in a non-use position with inwardly swiveled filler inlet compartment lid.

FIGS. 1, 2 show a perspective view of a filler inlet compartment lid of a motor vehicle according to another embodiment of the present disclosure in the non-use position with the filler inlet compartment lid swiveled in (FIG. 1) or in the use position with the filler inlet compartment lid swiveled out (FIG. 2). Corresponding features are identified by identical reference numbers, so that reference is made to the preceding description, and only differences will be discussed below. The areas of the filler inlet compartment lid arrangement inside the vehicle are marked with dashed lines in FIGS. 1, 2. The lid axis 11 is vertical in the view on FIGS. 1, 2. The perspective view on FIGS. 1, 2 shows the filler opening 22.1 for filling up the motor vehicle with fuel and the filler opening 23.1 (sealed by a threaded coupling) for filling up the motor vehicle with urea.

As in the sequence of FIGS. 3 to 4, the sequence of FIGS. 1 to 2 shows how the filler inlet compartment lid 10 swivels the filler module 20 away from a vehicle interior (left on FIGS. 1, 2) (toward the right on FIGS. 1, 2) while the filler inlet compartment lid 10 swivels out of the closed non-use position depicted on FIG. 1, in which the filler inlet compartment lid 10 aligns flush with the vehicle body, and into an open or use position depicted on FIG. 2, also away from the vehicle interior, and in so doing facilitates access to the filler openings 22.1, 23.1, which in this use position include an angle of about 75° with the edge of the vehicle body. In the non-use position with the filler inlet compartment lid 10 swiveled in and aligned flush with the vehicle body (FIG. 1), the longitudinal extension of the filler module 20 perpendicular to its module axis 21 includes an angle with the longitudinal extension of the filler inlet compartment lid 10 perpendicular to its lid axis 11 that measures about 10° in the exemplary embodiment on FIGS. 1, 2.

In the exemplary embodiment on FIGS. 1, 2, the filler module 20 is also slideably mounted to the filler inlet compartment lid 10 by means of a linear guide, or hinged to the filler inlet compartment lid 10 by means of several levers. In the exemplary embodiment on FIGS. 1, 2, the module axis 21 is arranged on a side (on the right on FIGS. 1, 2) of the lid axis 11 facing away from the linear guide or hinged joint, in other words outside of the area between the lid axis 11 and bond between the filler module 20 and filler inlet compartment lid 10.

To provide a better overview, the perspective view on FIGS. 1, 2 does not show the latch 40 for positively locking the swiveled-in filler module 20, or the push & release locking mechanism and the elastic spring means, which biases the filler inlet compartment lid 10 away from the vehicle interior. The latch 40 in the exemplary embodiment on FIGS. 1, 2 here only engages into the filler opening 22.1 of the filler module 20 so as to form a seal in the locked position, while the filler opening 23.1 can be or is separately sealed by the threaded coupling. In the exemplary embodiment on FIGS. 1, 2, the filler inlet compartment lid 10 can be swiveled out of the closed, locked closed or non-use position that is aligned flush with the vehicle body (FIG. 1) away from the vehicle interior (to the right) by about 30° and into the open or use position. Visible in the perspective view on FIGS. 1, 2 is a stop 24 for the filler module 20, which positively limits an outward swiveling of the filler module 20, and hence also of the filler inlet compartment lid 10, through contact with the vehicle body, as evident from FIG. 2.

Figure 5:
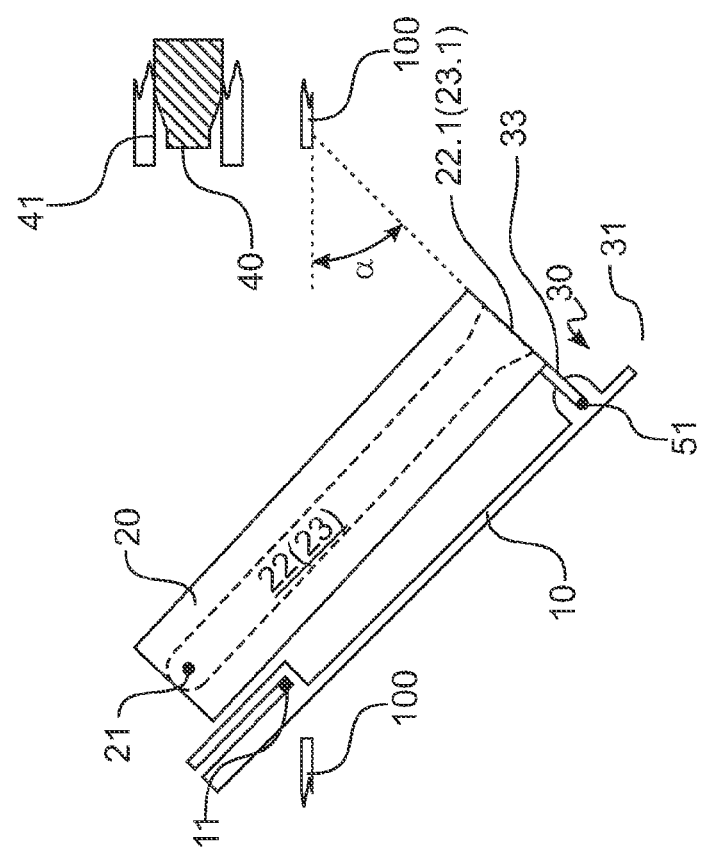
FIG. 5 illustrates a filler inlet compartment lid arrangement of a motor vehicle according to another embodiment of the present disclosure in a view corresponding to FIG. 3.
Figure 6:
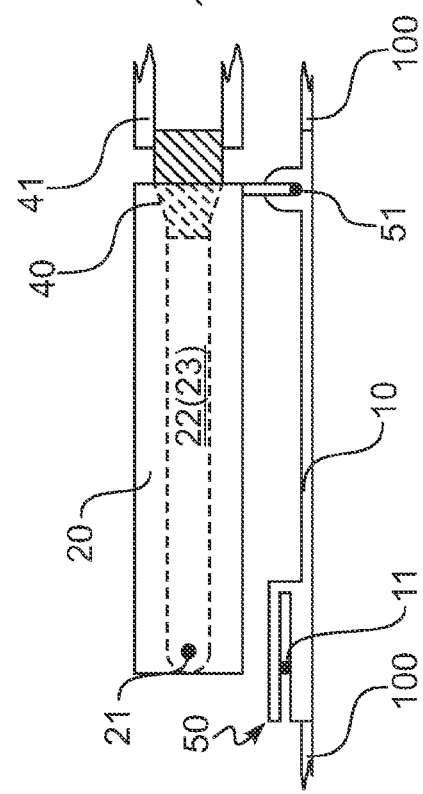
FIG. 6 illustrates the filler inlet compartment lid arrangement of FIG. 5 in a view corresponding to FIG. 4.

In a view corresponding to FIGS. 3, 4, FIGS. 5, 6 show a filler inlet compartment lid arrangement of a motor vehicle according to another embodiment of the present disclosure in a non-use position with the filler inlet compartment lid swiveled in (FIG. 5) or in a use position with the filler inlet compartment lid swiveled out (FIG. 6). Corresponding features are once again identified with identical reference numbers, so that reference is made to the preceding description, and only differences will be discussed below. In the embodiment on FIGS. 5, 6, the filler inlet compartment lid 10 is mounted in a rotary slide bearing 50 so that it can swivel around the lid axis 11 relative to a vehicle body 100 and perpendicular to the lid axis 11. A stop positively limits a shifting toward the lid axis 11. The filler module 20 is mounted so that it can swivel around the module axis 21 relative to the vehicle body 100, and in the exemplary embodiment on FIGS. 5, 6 is hinged to the filler inlet compartment lid 10. To this end, the carrier 33 of the filler module 20 is hinged with the filler inlet compartment lid 10 in a hinged joint 51.

As shown by the sequence of FIGS. 5 to 6, the filler inlet compartment lid 10 swivels the filler module 20 away from a vehicle interior (above on FIGS. 5, 6) (downwardly on FIG. 5, 6) while the filler inlet compartment lid 10 swivels out of a closed non-use position depicted on FIG. 5, in which the filler inlet compartment lid 10 aligns flush with the vehicle body 100, and into an open use position depicted on FIG. 6, also away from the vehicle interior, and in so doing facilitates access to the filler openings 22.1, 23.1 or passages 22, 23. The kinematics, in particular of the rotary slide joint 50, here cause the filler inlet compartment lid 10 to dip behind the body 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle filler inlet compartment lid arrangement comprising:
    a filler inlet compartment lid configured to be mounted on a vehicle body so that it can swivel about a lid axis; and
    a filler module mounted to the filler inlet compartment lid for swiveling relative to the vehicle body about the lid axis, the filler module having at least one filler passage configured for fluid communication with a supply tank on the vehicle body, the filler module arranged parallel to the filler inlet lid from an opening of the at least one filler passage until the lid axis,
    wherein the filler module is hingedly mounted to the filler inlet compartment lid for swiveling relative to the filler inlet compartment lid about a module axis spaced apart from the lid axis relative to the vehicle body.

2. The lid arrangement according to claim 1, wherein the module axis is arranged on a side of the lid axis facing away from a connection between the filler module and filler inlet compartment lid.

3. The lid arrangement according to claim 1, wherein the filler module is slideably mounted to the filler inlet compartment lid for sliding relative to the filler inlet compartment lid.

4. The lid arrangement according to claim 1, wherein an inlet opening of the at least one filler passage of the filler module in a swiveled-out use position includes an angle that measures at least 45° with an edge of the vehicle body that encompasses the filler inlet compartment lid in a non-use position.

5. The lid arrangement according to claim 1, wherein the filler inlet compartment lid comprising opposing edges and the lid axis is arranged between the opposing edges.

6. The lid arrangement according to claim 1, further comprising a latch for positively locking at least one of the filler module and the filler inlet compartment lid in a non-use position.

7. The lid arrangement according to claim 6, wherein the latch in a locked position engages into at least one filler passage of the filler module to form a seal.

8. The lid arrangement according to claim 1, wherein the filler module further comprises a stop for positively limiting the filler inlet compartment lid from swiveling beyond a use position.

* * * * *